May 19, 1964     E. W. FARMER     3,133,395
UNDERWATER WEED SAW
Filed Feb. 13, 1963

INVENTOR.
EARL WESLEY FARMER
BY
ATTORNEY

United States Patent Office 3,133,395
Patented May 19, 1964

3,133,395
UNDERWATER WEED SAW
Earl Wesley Farmer, 1402 21st Ave. N.,
Minneapolis, Minn.
Filed Feb. 13, 1963, Ser. No. 258,198
1 Claim. (Cl. 56—8)

This invention relates broadly to manually operated saws; more particularly to a flexible chain-type saw; and specifically to a flexible chain-type saw that is manually manipulated and designed for the purpose of cutting underwater vegetation close to the roots thereof.

The principal object of this invention is to provide a flexible chain-type saw for cutting underwater vegetation in lakes, rivers, ponds and the like.

Another object of this invention is to provide a flexible saw of the class described particularly constructed and designed for manual manipulation by two operators wading in relatively shallow water, for example, shorelines, bathing beaches, fish rearing ponds and the like.

A further object of this invention is to provide a flexible, manually manipulated chain-type saw that while primarily intended for use in relatively shallow waters by two wading operators, said saw is also capable of being used in deeper waters by two operators in separate boats spaced apart the one from the other over an underwater weed bed.

Still another object of this invention is to provide a flexible underwater weed saw of the type described that is simple and relatively inexpensive to manufacture, which needs little or no service and which is practically indestructible.

A still further object of this invention is to provide a flexible underwater weed saw of the type described which, because of its novel construction, will inherently follow the contours of the bottom of a body of water thereby making its cut at the very bottom of the said underwater vegetation.

These and other objects of this invention will become apparent from the following specification and claim when taken in conjunction with the appended drawing which forms a part of this application and in which drawing, like characters indicate like parts throughout the several views.

To the above end, generally stated, the invention consists of the following devices and combination of devices hereinafter described, and defined in the claim.

Referring to the drawings.

Figure 1:
FIG. 1 is a view showing two operators working with the invention in a body of water.
Figure 2:
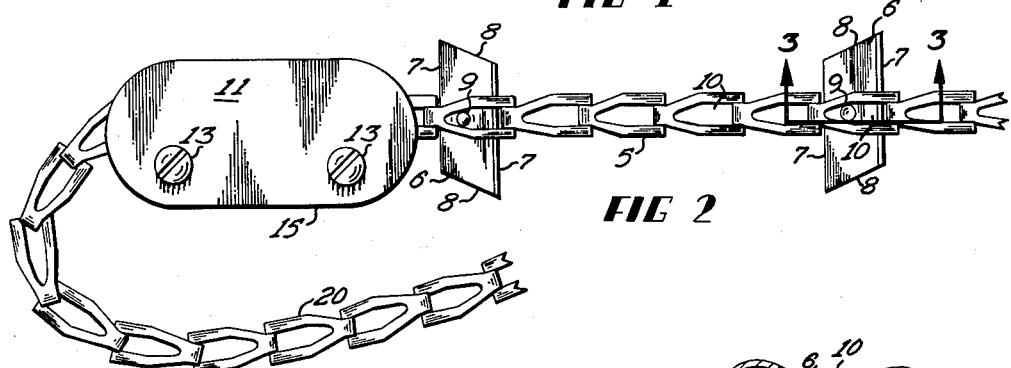
FIG. 2 is a fragmentary portion of the invention, one weight member being secured thereto.

The numeral 5 is directed broadly to the chain, shown fragmentarily on the drawing, but which in a commercial form of the invention is of arbitrary length depending upon the body of water in which the subject invention will be used. However, the same will preferably be furnished in lengths of fifty to one hundred feet to facilitate operation, handling and storage.

The numeral 6 indicates a plurality of relatively short cutting blades the edge portion 7 of which are sharpened and the end portions 8 of which are angularly cut but not necessarily sharpened. It is to be noted however, that said end portion may be slightly serrated during the operation of shearing said blades to proper length.

Figure 3:
FIG. 3 is a fragmentary portion of the chain in side elevation taken on the line 3—3 of the FIG. 2 preferred way of mounting the cutting teeth thereon, some parts being sectioned.
Figure 3:
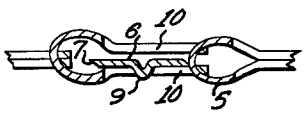
Figure 4:
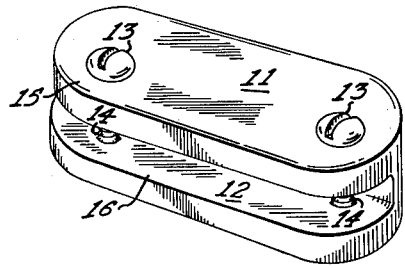
FIG. 4 is a perspective view showing one of the weight members.

The cutting blades 6 are longitudinally disposed along the chain 5 at regular spaced intervals, preferably about four inches, and are secured in such position by means of a dimple 9 stamped substantially in the transverse and longitudinal center of each cutting blade 6. It will be understood that the said dimple 9 is formed and positioned to protrude slightly through an opening 10 in one of the links of the chain 5, see FIG. 3.

While it will be understood that the flexible chain saw 5 will sink to bottom of a body by virtue of its own weight, it has been found that better cutting action and more complete submersion is achieved by the use of supplemental weight members 11. These weight members 11 are constructed with a longitudinally disposed passageway 12 that is dimensioned to accommodate the chain 5 which passes longitudinally through the passageway 12 thereof. A pair of longitudinally spaced bolts 13 are constructed and arranged to extend through the passageway 12 and in one preferred form said bolts 13 are secured in said weight member by means of screw threaded engagement with screw threaded bores 14 in the upper flange 15 and the lower flange 16 of the weight member 11. The purpose of these bolts 13 is to narrow the passageway 12 and thus prevent endwise movement of the said weight member on the chain 5. It will be understood that the said bolts 13 are inserted through the bores 14 in the upper flange 15 by-passing the chain 5 in the passageway 12 at the narrowest point of the links of the said chain and thence into screw threaded engagement with the screw threaded bore 14 in the lower flange 16 of the weight member 11. It is highly important to note that the said weight member 11 is dimensioned longitudinally to fit between the respective cutting blades 6 longitudinally spaced along the flexible chain 5. The purpose of the latter being to permit the placing of a weight member at any point on said chain 5, either at each end portion thereof or intermediately spaced between said end portion as may be required by a specific weed cutting operation.

It will be obvious from an examination of FIG. 1, that to make use of the flexible weed saw 5 two operators 17 are necessary to impart proper movement to the said saw. With the operators 17 stationed apart in a location to be cut by the saw the same is dropped to the bottom of a body of water 18 containing underwater vegetation to be cut 19. As shown in FIG. 1 it will be noted that the outer end portion 20 of the chain 5 are devoid of cutting blades 6 as a safety means to facilitate handling.

With an operator 17 grasping each end 20 of the chain the saw portion of which is on the bottom of the body of water 18 and held in close proximity therewith by the weight members 11, the operators will commence to move slowly through the underwater weed bed 19 and at the same time impart a sawing action to the chain at right angles to the path of movement of the operators 17 thereby causing the cutting blades 6 on the chain 5 to cut off the said underwater vegetation close to the roots thereby. Obviously, according to the size and extent of the underwater weed bed 19 a number of passes will often be necessary with a flexible saw of normal usable length however, one cut through any given area is generally sufficient due to the excellent cutting capabilities of the subject invention on vegetation of the type described.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claim as are stated herein or required by the prior art.

What I claim is:

An underwater weed saw comprising in combination, a flexible chain composed of a plurality of interconnected links having a central opening and upper and lower leaves in each link affording a transverse separation therebetween, a plurality of longitudinally spaced, laterally disposed cutting blades mounted on the links of the flexible chain between the said leaves of certain of the interconnected links and extending outwardly thereof in lateral arrangement relative thereto, said cutting blades being relatively thin in cross-section and having sharpened cutting edges formed in each side thereof, said cutting blades being secured in the said links of the flexible chain by forming a relatively deep dimple substantially at the longitudinal and transverse center of each cutting blade, said dimple extending into the opening in the respective links to thus position the cutting blade relative to its mounting link against endwise and lateral movements, at least one weight member selectively and adjustably mounted on the flexible chain at a predetermined position, and the outer end portion of said flexible chain being devoid of cutting blades to afford handholds for sawing movements.

References Cited in the file of this patent
UNITED STATES PATENTS

| | | |
|---|---|---|
| 1,124,124 | Freeman | Jan. 5, 1915 |
| 1,897,820 | Pitchford | Feb. 14, 1933 |
| 2,603,051 | Williams | July 15, 1952 |